Oct. 29, 1963  S. H. DENGLE ETAL  3,108,358
MACHINE FOR SCARFING PRINTING PLATES
Filed May 19, 1960  4 Sheets-Sheet 1
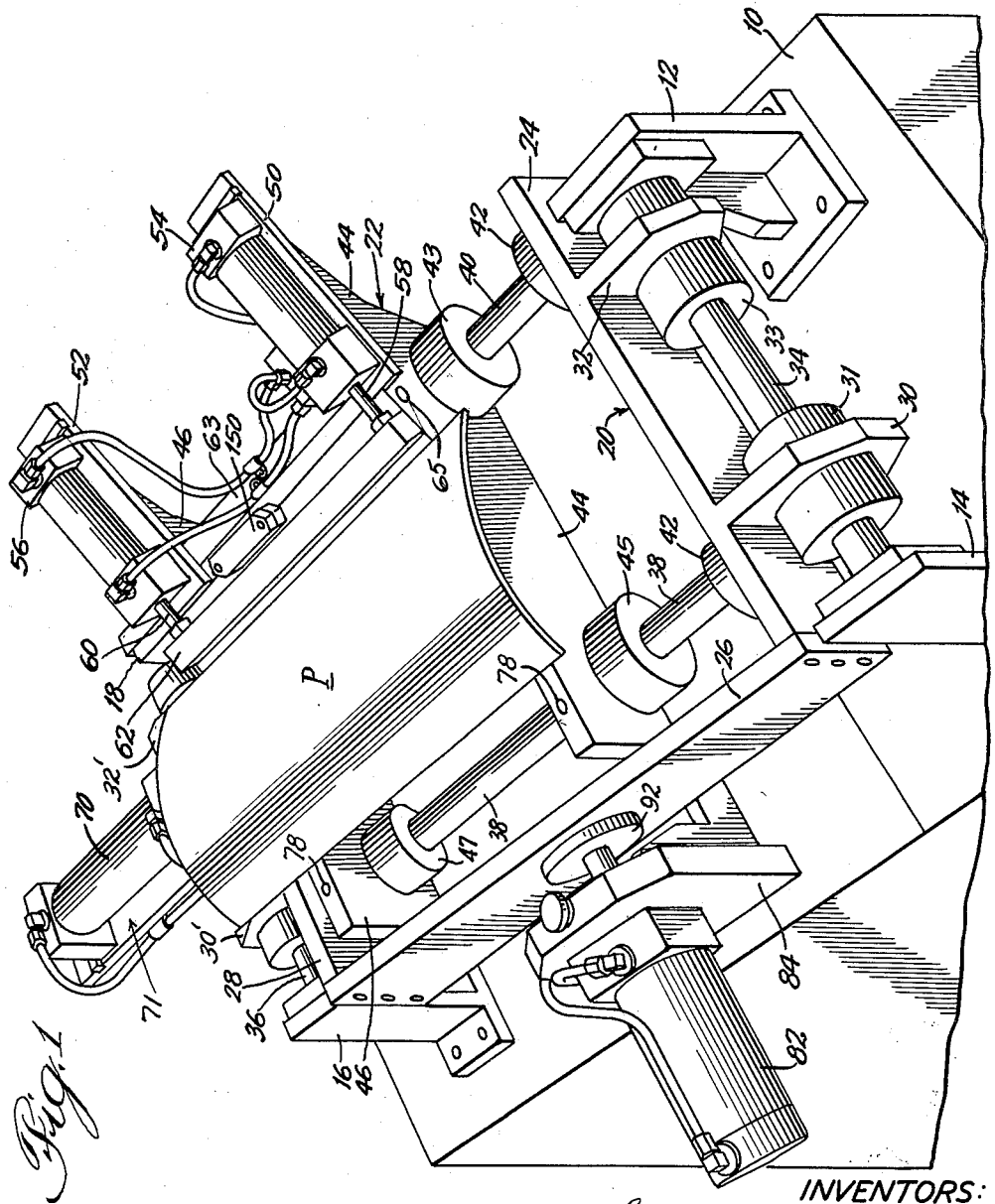
INVENTORS:
Sydney H. Dengle
and Thomas G. Stratton;
BY Bair, Freeman & Molinare
ATTORNEYS.

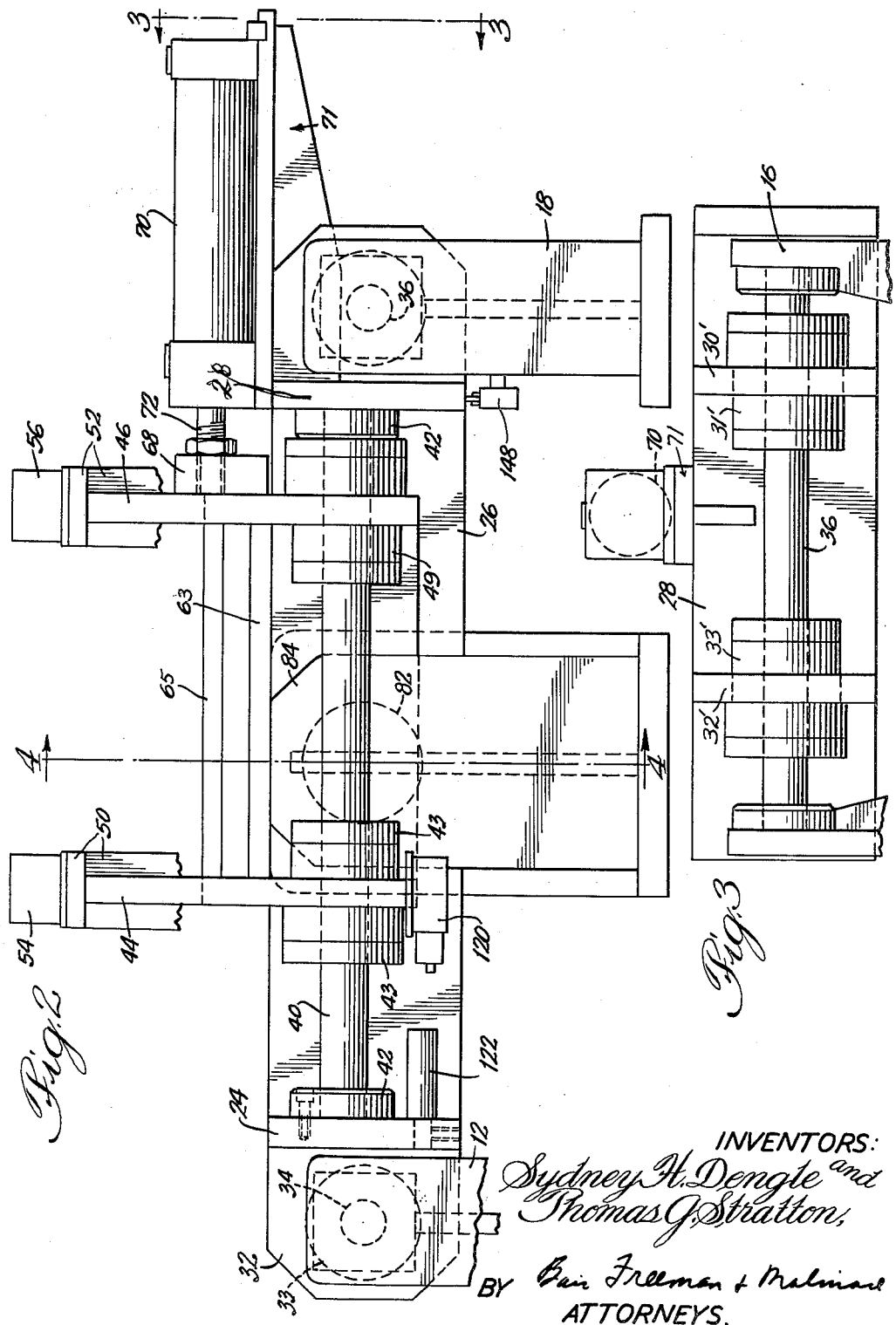

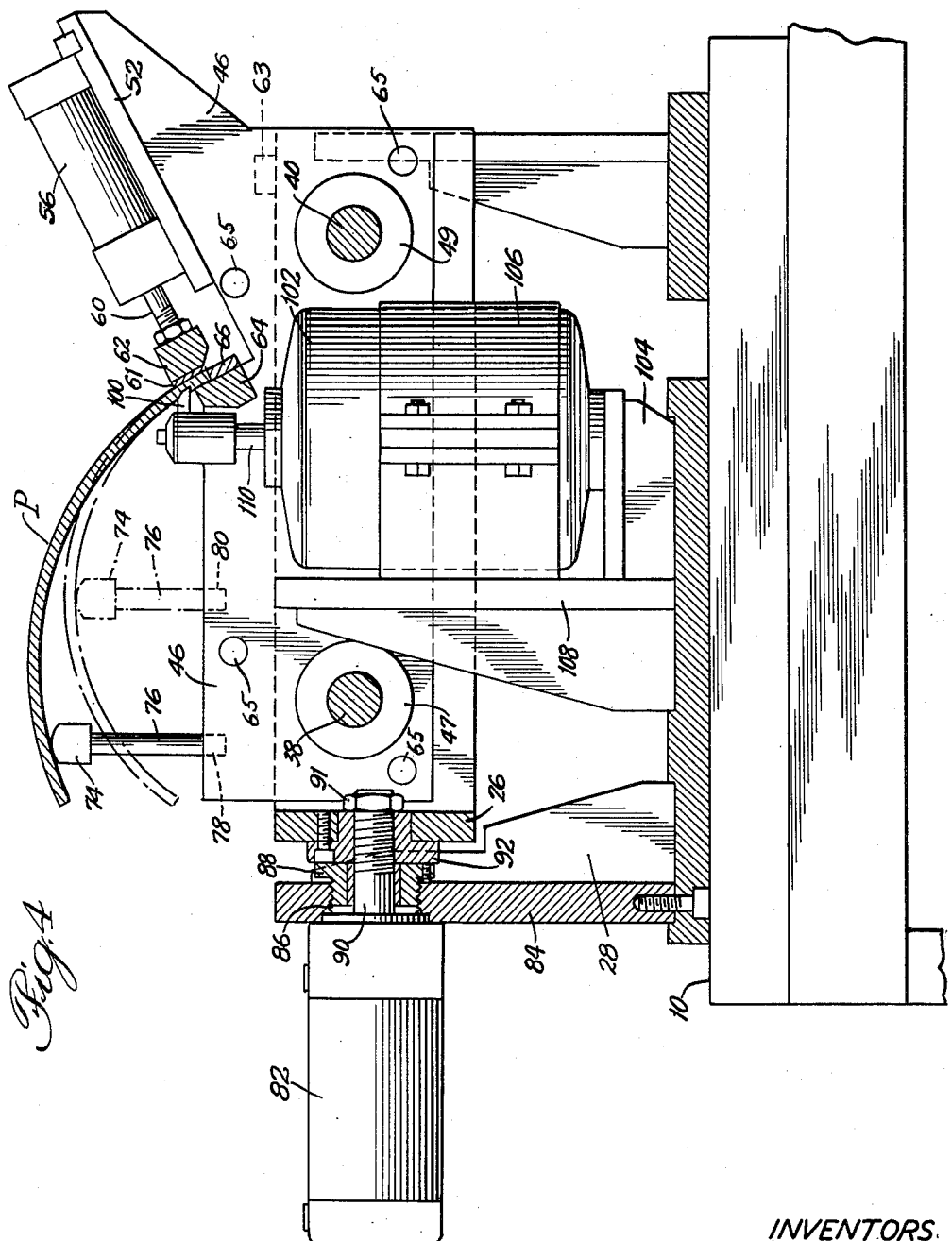

Oct. 29, 1963 S. H. DENGLE ETAL 3,108,358
MACHINE FOR SCARFING PRINTING PLATES
Filed May 19, 1960 4 Sheets-Sheet 4

INVENTORS:
Sydney H. Dengle
and Thomas G. Stratton,
BY Bair Freeman + Molinare
ATTORNEYS.

3,108,358
MACHINE FOR SCARFING PRINTING PLATES
Sydney H. Dengle and Thomas G. Stratton, Des Moines, Iowa, assignors to Meredith Publishing Company, Des Moines, Iowa, a corporation of Iowa
Filed May 19, 1960, Ser. No. 30,190
4 Claims. (Cl. 29—21)

This invention relates to a machine for scarfing printing plates. Printing plates which are secured to a press cylinder by the tension lock-up method require grooves or scarfs in the underside which cooperate with hooks adapted to run in slots formed in the circumference of the cylinder. The hooks bear against the sides of the scarfs near opposite edges of the plate and lock the plate securely to the surface of the cylinder.

One object of the present invention is to provide a scarfing machine that will cut a scarf of uniform depth irrespective of the thickness of the plate; that will scarf a plate of any length or any curvature; and that is adjustable to change the length and depth of the scarf and the distance of the scarf from the edge of the plate.

Another object is to provide a machine which is automatic in operation after the plate has been mounted thereon. The plate automatically moves into contact with the cutter and back to its original position after the cutting of the scarf has been completed.

These and other objects of the invention will become apparent from the following description and the accompanying drawings, in which:

FIGURE 1 is a rear perspective view of a scarfing machine constructed in accordance with the invention;

FIGURE 2 is a front elevational view of the machine of FIGURE 1;

FIGURE 3 is a side elevational view taken along the line 3—3 of FIGURE 2;

FIGURE 4 is a sectional view taken along the line 4—4 of FIGURE 2;

Figure 5:
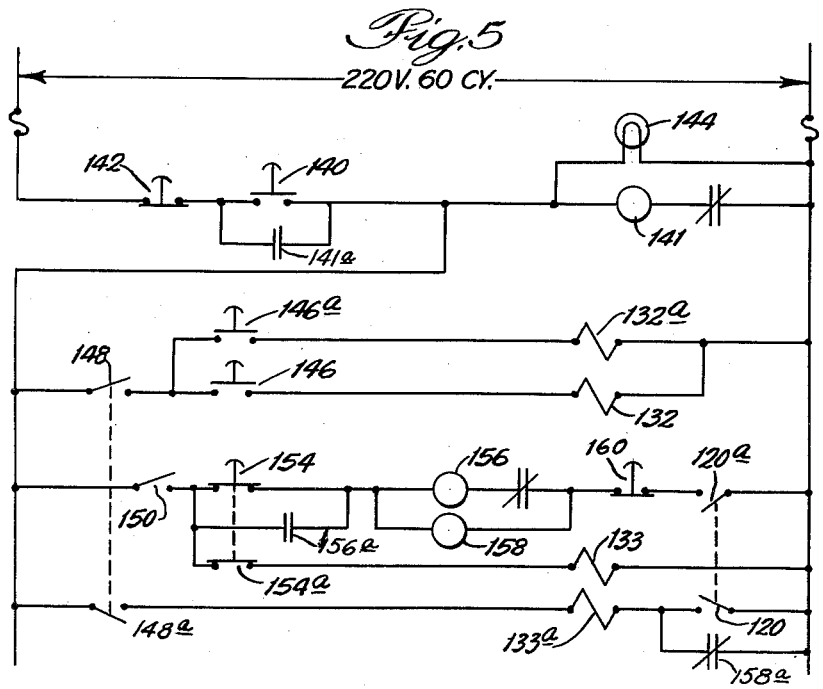
FIGURE 5 is a wiring diagram for the electrical system.

The machine is supported on a suitable table having a rectangular horizontal bed or base member 10. Four upright members, 12 and 14 disposed at one side of the machine, and 16 and 18 disposed at the other side of the machine, are adapted to support a movable frame, generally designated by the numeral 20, on which the plate to be scarfed is mounted. The upright members are bolted to the base 10 in conventional manner. A shaft 34 extends between the upright members 12 and 14 and a similar shaft 36 extends between the upright members 16 and 18. The side members 24 and 28 of the frame 20 carry ears or brackets 30, 30', 32, 32', which are rigidly fixed to sleeve-like bearings 31, 31', 33, 33', adapted to slide axially on the rod or shaft 34. The construction is best shown in FIGURE 1. The identical construction is used at the opposite side of the machine for securing the side member 28 of the frame to the rod 36. The frame 20 also includes a longitudinal member 26 which is secured by suitable bolts to the ends of the members 24 and 28. Thus the frame 20 may be moved laterally (across the short dimension of the base 10) on the rods 34, 36.

The frame 20 also comprises a pair of spaced rods 38, 40 which extend longitudinally of the frame parallel to member 26 and are secured at either end to the side members 24 and 28. The ends of the rods 38, 40 are secured to the ends of the frame by means of a suitable block 42, shown in FIGURE 1. The carriage, indicated generally by the numeral 22, is adapted to slide on the rods 38, 40 in a direction longitudinally of the base member 10. The carriage comprises a pair of side members 44, 46 rigidly fixed to sleeve-like bearings 43, 45 and 47, 49 which embrace the rods 38 and 40 and are adapted to slide axially along the rods.

The side members 44, 46 extend angularly upward at the front of the machine and serve to support a pair of cylinders 54, 56 as described below. The side members 44, 46 of the carriage are spaced from each other by means of tie bars 63, 65 and a support 64 for the edge of the plate P which is to be scarfed on the machine. The support 64 consists essentially of a bar which is rigidly fixed to slots provided therefor in the side members 44, 46 of the carriage 22. A stop 66 comprising a bar of metal is mounted on the top of the support 64. Thus, the top surface of the support 64 and the side of the stop 66 provide surfaces against which the edge of the plate P bears, as best illustrated in FIGURE 4. The other end of the plate P is supported by means of a bar 74 which is mounted on uprights 76, the ends of which fits into openings 78 provided in the side members 44 and 46. A duplicate set of openings 80 is provided at a point spaced inwardly from the rear of the machine to support a plate having greater curvature, as shown in dot and dash lines in FIGURE 4. It will be appreciated that the height of the uprights 76 may vary in accordance with the size and curvature of the plate being processed.

The cutter assembly comprises a motor 102 mounted in upright position on a support 104 secured to the base 10. The motor is held in rigid upright position by a sleeve 106 which is secured to upright member 108 comprising part of the support 104, as best shown in FIGURE 4. The shaft 110 extending from the top of the motor 102 carries the cutter 100, the ends of which are formed to cut a scarf of the desired shape. The side of the scarf nearest the edge of the plate should be flat. The hook is adapted to engage the flat side and stress the plate in tension as hooks in opposed scarfs are moved away from each other. The motor with its integral cutter is mounted centrally between the ends of the base 10 and during operation it remains stationary. If desired, provision may be made for moving the motor and the cutter on support 104 axially of the base so that the scarf may be located beyond the central position toward one or the other ends of base 10.

In order to secure the edge of the plate being scarfed so that it does not move from its accurate location on the plate edge support 64, a pair of cylinders 54, 56 impose clamping pressure on a hold down bar 62 fixed to the ends of the piston rods 58 and 60 extending from the cylinders. The cylinders are mounted on plates 50, 52 secured to the top edge of the forward extensions of said members 44, 46. The hold-down or clamping bar 62 may be provided with a resilient surface such as a layer of rubber 61 fixed to the underside which contacts the surface of the plate. This prevents damage to the electrotype and also insures gripping of the plate.

Because the carriage supports the plate and the clamping means, the entire assembly is moved axially of the base on the rods 38, 40. To provide power for such movement a hydraulic cylinder 70 (cross-feed cylinder) is mounted on a bracket 71 extending from the right side of the machine and fixed relative to the frame 20. The cylinder has a piston rod 72, the end of which is secured to a block 68 which, in turn, is fixed to the side member 46 comprising part of the carriage 22. Thus, when the cylinder is actuated the rod 72 causes the entire carriage 22 to move on the rods 38 and 40. The distance the carriage moves determines the length of the scarf cut in the underside of the plate P.

In order to engage the cutter with the underside of the plate to the desired depth, another cylinder 82 which may be referred to as a "back feed cylinder," is mounted on the bracket 84 near the back of the machine. The bracket 84 is made from heavy stock and has a tapped opening 86 adjacent the end of the cylinder 82. The threads in the opening 86 are very fine and are adapted to receive a stop member 88 which has complementary threads and can be adjusted to regulate the distance between the flange of the stop and the frame 20. A boss 92 is mounted in the rear member 26 of the frame 20 and is internally threaded to receive the end of the rod 90. A locking nut 91 is screwed onto the end of the rod 90. Movement of the piston rod 90 in the cylinder 82 causes the entire frame 20 and the carriage mounted thereon to move transversely of the base on the side rods 34, 36. It will be appreciated that when the frame 20 is moved rearwardly by the piston 82 the underside of the plate is brought into engagement with the cutter 100 to cause cutting of the scarf. By adjusting the location of the stop 88 the distance through which the frame moves may be regulated, which in turn determines the depth of the scarf. The length of the scarf is determined by the travel of the carriage 22, as indicated above.

The distance from the edge of the plate to the scarf may be regulated by changing the width of the stop 66 which is secured to the surface of the support 64. Stop 66 is secured to the support by means of a couple of screws which enter tapped openings in the support. The wider the stop, the closer the scarf is located to the edge of the plate.

Operation

In operating the machine the plate P to be scarfed is mounted on the carriage with the edge nearest the scarf engaging the edge support 64 and the stop 66. Care must be taken to make certain that the plate is pushed tightly into contact with both surfaces. The portion of the plate remote from the edge is supported by means of the bar 74. The longitudinal location of the plate P is determined by the location of the scarf. The plate is positioned so that the portion to be scarfed is located directly opposite the cutter 100. The cutter begins its cutting operation at the left end of the plate and advances to the right end, the right end being the far end as viewed in FIGURE 1. But prior to cutting the hydraulic cylinders 52, 54 have been actuated by introducing hydraulic fluid into the far ends to push the clamping bar 62 into contact with the upper surface of the plate immediately adjacent the stop 66. The plate is now securely held on the carriage. The motor is then started, which causes the cutter 100 to rotate at high speed. The plate is then brought into contact with the cutter by actuating the hydraulic cylinder 82. Hydraulic fluid is introduced into the right end of cylinder 82 as viewed in FIGURE 4 to cause the piston rod 90 to retract, thus bringing the face of the boss 92 into contact with the face of the stop 88. Movement of the rod 90 causes the entire frame 20 including the carriage and the plate mounted thereon to advance transversely with respect to the base. This causes the cutter to cut into the backside of the plate, the depth being determined by the location of the stop 88. A scale may be marked on the outer surface of the stop to indicate the depth of cut. It will be noted that the depth of the cut is gauged from the bottom of the plate, i.e. the surface of the support 64 on which the plate rests. Thus, the depth of the scarf is not affected by the thickness of the plate.

The carriage 22 is then moved longitudinally of the base 10 by introducing hydraulic fluid in the outer end of the cylinder 70. The carriage moves to the left (toward the viewer in FIGURE 1) until the microswitch 120 strikes the gauge pin 122 which projects from the face of the frame member 24. The microswitch actuates solenoids which in turn reverse the flow of fluid to hydraulic cylinders 70, 82 and cause the carriage to retract to its normal position. It will be appreciated that the length of the scarf may be controlled by adjusting the length of the gauge pin 122. The shorter the gauge pin, the farther the carriage travels and the longer the scarf will be.

Figure 6:
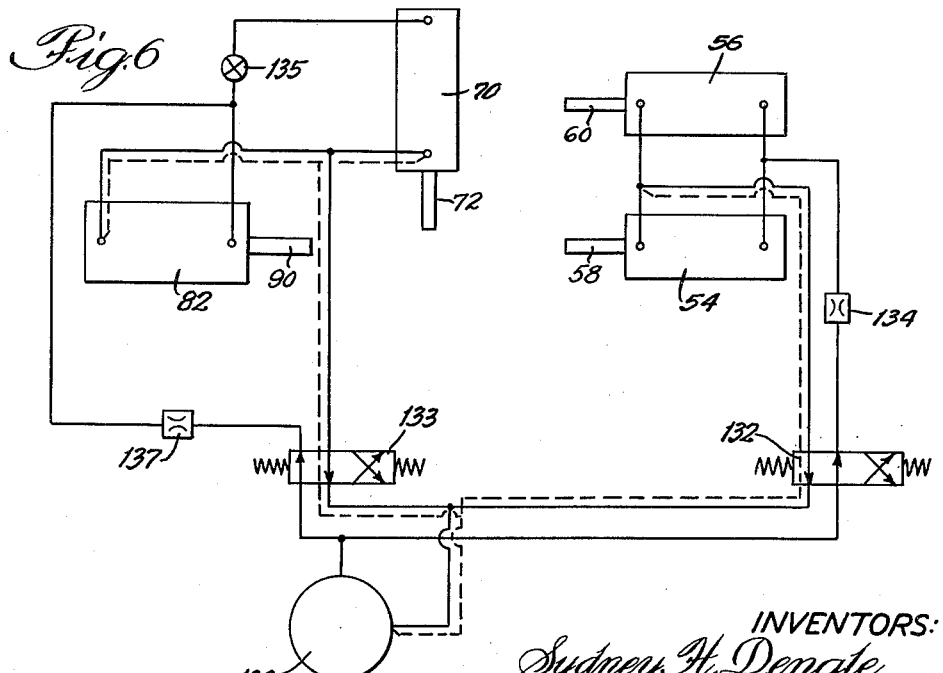
FIGURE 6 is a schematic diagram of the hydraulic system.

Considering now in more detail the electrical and hydraulic control system, reference is made particularly to FIGURES 5 and 6 of the drawing. In FIGURE 6 the dotted lines indicate the return flow of fluid. The machine control circuit operates on 220 volt, 60 cycle, alternating current. To start the machine the hydraulic motor switch 140 is closed and this energizes the hydraulic motor contactor 141 an indicator light 144. The contactor starts the motor 130 and also seals in the normally open relay 141a. The hydraulic motor continues to run until the motor stop switch 142 is opened. A green light 144 is energized when the motor is running. Next the switch 146 is closed to energize the clamp solenoid 132. This actuates the solenoid valve comprising part of the assembly 132 and causes the hydraulic fluid to flow through the speed control valve 134 to the cylinders 54 and 56. This in turn causes the clamping bar 62 to clamp the edge of the plate against the support 64, as previously pointed out. When the hydraulic valves are energized in either direction they will remain in that position even after the current has stopped flowing through the coil of the solenoid. This is true of all of the hydraulic valves used in the control set up. Microswitch 148, which is normally open, is held closed by the carriage when it is in a back or rest position thus allowing the operation of switch 146a and solenoid 132a to clamp the plate or to allow switch 146 and solenoid 132 to unclamp the plate. As the carriage moves forward toward the cutters, microswitch 148 is opened preventing the plate from being unclamped as the circuit through elements 146 and 132 or 146a and 132a is broken. This circuit cannot operate until the plate carriage returns to the back or at rest position. As the clamping bar 62 moves downwardly it closes the contacts of microswitch 150 to connect the solenoid valve 133 and the actuating switch therefor to the power supply. It will be appreciated, therefore, that movement of the carriage and the frame by the cylinders 82 and 70 cannot be effected until after the clamping bar has secured the plate against the support 64. This is merely a safety device and is included as an optional part of the invention. If the switch 146a is closed, the bar 62 lifts by energizing the unclamping solenoid valve 132a which is housed with valve 132.

The start button or switch 154 energizes the motor cutter contactor 156 and the control relay 158 which starts the machine on its cycle. When the switch 154 is closed, switch 154a is also closed and the starting solenoid 133 is energized through the contacts of the microswitch 150 which is shown in FIGURE 1. Switch 150 is closed when the clamping bar 62 is down. The hydraulic fluid which flows through the valve 133 when the switch 154 has been closed enters the back feed cylinder 82 through speed control valve 137 to cause the frame to move toward the stop 88. After this movement has taken place the pressure continues to build up until a port in the bypass valve 135 opens, which causes fluid to pass into the cross-feed cylinder 70. It will be appreciated, therefore, that the cross-feed cylinder will not be actuated until after the frame has been retracted by the back feed cylinder. After the plate has been moved by the advancement of the carriage, the microswitch 120 mounted on the underside of the carriage strikes the scarf gauge pin 122, energizing the return solenoid 133a housed in solenoid valve housing 133. This causes the carriage to return to its starting position by reason of the reversal of flow of fluid to the back-feed and cross-feed cylinders, respectively. Operation of emergency stop button 160 results in the following action: When clamp bar 62 moves to clamp the plate, microswitch 150 is closed. Thus start button 154 energizes contactor 156 through the stop button (normally closed) and microswitch 120a (normally closed) also energizes control relay 158. Contactor 156 seals in through 156a (normally open) and control relay 158 opens its normally closed contacts 158a. Start button 154a energizes solenoid 133 to start the carriage to a predetermined depth. If the emergency stop button 160 is pushed at any time the control relay 158 is deenergized which closes contacts 158a and the carriage is returned to resting position because solenoid 133a is energized. The contacts of the overload control 158a are normally closed.

From the foregoing it is apparent that this invention provides an improved scarfing machine which will accurately scarf printing plates to any predetermined depth which is accurately measured from the underside of the plate. The machine also permits producing scarfs of variable length and at any location along the length of the plate. This location is determined by the longitudinal position of the plate on the carriage. It will be noted that the plate may extend beyond the end of the carriage on the frame since the carriage is disposed above the framework. Although hydraulic means have been illustrated for actuating the frame, the carriage and the hold-down bar, it will be appreciated that mechanical means may be substituted therefor. Other modifications of the invention will occur to those skilled in the art without departing from the true scope and spirit of the invention as set forth in the specification and in the appended claims. It is our intention to include as our invention all such modifications which may reasonably be included within the scope of the claims.

What we claim as new and desire to secure by Letters Patent of the United States is:

1. A machine for scarfing a curved printing plate comprising a supporting base, a frame mounted on supports above said base for reciprocative movement with respect thereto, a plate supporting carriage mounted on said frame for movement in a direction at right angles to the direction of movement of said frame, a rotatable cutter fixed to said base beneath said carriage, said carriage comprising a plate-edge support for embracing one edge of said plate to locate said plate with respect to said cutter and an upright member for supporting said plate at a point remote from said edge, a movable clamping bar mounted on said carriage above said plate-edge support for clamping said edge of said plate against said plate-edge support, means for moving said frame and said carriage whereby said plate supported by said carriage is brought into contact with and moved relative to said cutter to produce said scarf in the surface of said plate at a fixed distance from said clamped edge.

2. A machine for scarfing a curved printing plate comprising a supporting base, a pair of shafts mounted on said base above the plane of said base, a frame mounted for limited lateral movement on said shafts, a plate supporting carriage mounted on said frame and adapted to move back and forth in a direction at right angles to the movement of said frame, mounting means for said plate secured to said carriage and including clamping means for clamping one edge of said plate comprising a block for engaging the marginal underside of the plate, a stop on the surface of said block for engaging the edge of said plate, a movable bar for clamping said edge of said plate to said block, a rotatable cutter mounted on said base beneath said carriage adjacent the underside of said edge and means for advancing and retracting said frame and said carriage said movable bar, said frame and said carriage being actuated by fluid cylinders.

3. A machine for scarfing a curved printing plate comprising a supporting base, a frame mounted on supports above said base for reciprocative movement with respect thereto, a plate supporting carriage mounted on said frame for movement in a direction at right angles to the direction of movement of said frame, a rotatable cutter fixed to said base beneath said carriage, said carriage comprising a plate-edge support for embracing one edge of said plate and a removable upright member for supporting said plate at a point remote from said edge, a movable clamping bar mounted on said carriage above said plate-edge support for clamping said edge of said plate against said plate-edge support, stop means mounted fixedly with respect to the base for limiting the movement of said frame and thereby controlling the depth of the scarf produced by the cutter, and means for moving said frame and said carriage whereby said plate supported by said carriage is brought into contact with and moved relative to said cutter by the movement of said frame and said carriage.

4. The machine of claim 3 in which said frame is actuated by a fluid cylinder mounted on a bracket fixed to said base and said stop is threadedly engaged with said bracket to permit adjusting the position of the stop with respect to the bracket.

References Cited in the file of this patent

UNITED STATES PATENTS

| 1,616,256 | Ericson | Feb. 1, 1927 |
| 2,410,355 | Nesbitt et al. | Oct. 29, 1946 |
| 2,537,604 | Ricards et al. | Jan. 9, 1951 |
| 2,649,000 | Bice | Aug. 18, 1953 |
| 2,801,716 | Colby | Aug. 6, 1957 |